Figure 5:
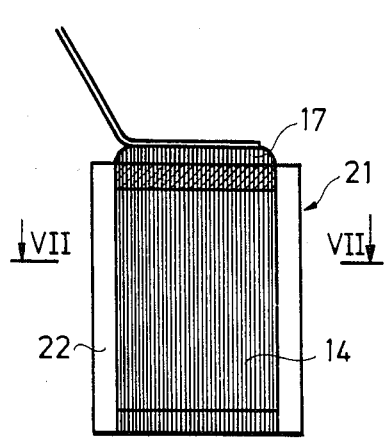

United States Patent [19]
Zoltán

[11] Patent Number: 4,578,738
[45] Date of Patent: Mar. 25, 1986

[54] ANODE STRUCTURE FOR ELECTROLYTIC FIBRE CAPACITORS AND METHOD FOR MANUFACTURING THE SAME

[76] Inventor: Leszlauer Zoltán, Batthyány tér 13, 9022 Györ, Hungary

[21] Appl. No.: 670,405

[22] Filed: Nov. 9, 1984

[30] Foreign Application Priority Data

Nov. 11, 1983 [HU] Hungary ............................ 38060/83

[51] Int. Cl.⁴ ........................ H01G 4/16; H01G 1/13; H01G 7/00
[52] U.S. Cl. .................................. 361/324; 29/25.42; 361/308
[58] Field of Search ................... 361/433 A, 308, 322, 361/324; 29/25.42

[56] References Cited

U.S. PATENT DOCUMENTS

| 2,274,011 | 2/1942 | Sträb | 361/308 |
| 2,299,667 | 10/1942 | Waterman | 361/433 A |
| 4,188,651 | 2/1980 | Dornfeld et al. | 361/322 |

FOREIGN PATENT DOCUMENTS

| 894533 | 3/1944 | France | 361/308 |
| 157227 | 12/1980 | Japan | 361/433 A |
| 613412 | 6/1978 | U.S.S.R. | 29/25.42 |

*Primary Examiner*—Donald A. Griffin
*Attorney, Agent, or Firm*—Handal & Morofsky

[57] ABSTRACT

The invention relates to a method and apparatus for making an electrolytic capacitor formed from thin fibers coated with a valve metal and interconnected in an end region by insulating resin material.

14 Claims, 10 Drawing Figures

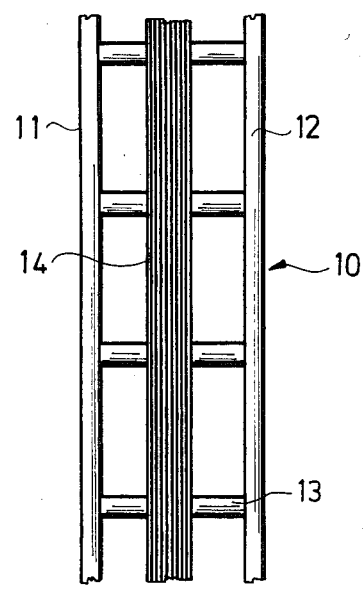
Fig. 1
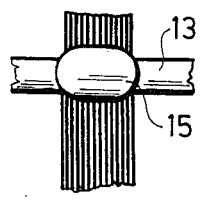
Fig. 2.a
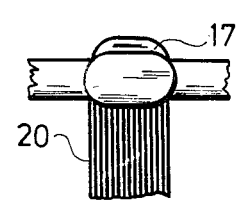
Fig. 2.b
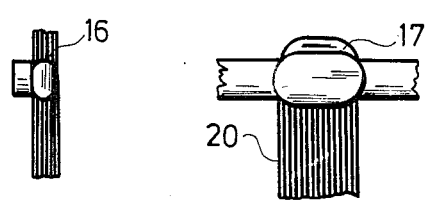
Fig. 3.a
Fig. 3.b
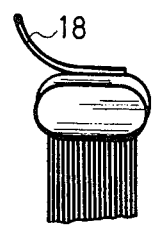
Fig. 4

ANODE STRUCTURE FOR ELECTROLYTIC FIBRE CAPACITORS AND METHOD FOR MANUFACTURING THE SAME

The invention relates to an anode structure for electrolytic fibre capacitors and to a method for manufacturing such an anode structure. The invention also relates to a method of making an electrolytic capacitor from the anode structure.

In my U.S. Pat. No. 4,138,712 a method for making an electrolytic capacitor with increased storage capacity was described. The essence of that patent lied in an optimum dimensioning usable for fibre capacitors which proved that in case of fibre capacitors with parallel fibres there exists a determined relationship between the diameter of the fibres, the thickness of the oxide coating and the operational voltage, if the energy that can be stored in a unity volume should be maximized.

The calculations used in that patent have shown that the conventional trend of increasing the available surface has certain limits, and if the thickness of the oxide layer is not sufficiently high, then the decrease in the fibre diameter or the increase in the surface can not increase the specific storage capacity any more.

The calculations have shown that higher storage capacity can be attained if the thickness of the oxide layer compared to the fibre diameter is greater than it was used previously.

Electrolytic fibre capacitors were conventionally manufactured by using sintering technique, in which the cohesional connections among the fibres acted against the establishment of thicker oxide coatings (there was the hazard of clogging), and the sintering technique rendered the regular arrangement of the fibres impossible. A typical example of the sintered fibre capacitors can be seen in British Pat. No. 1,154,599.

In the German publication 1,539,696 the possibility of making electrolytic capacitors from dielectric (insulating) fibres coated by a valve metal is mentioned, however, this publication considers such capacitors disadvantageous owing to their alleged small surface to volume ratio and to the lack of physical and mechanical stability. In that publication an anode structure made of valve metal fibres has been suggested, in which the fibres are inserted in tubes made of iron or of a similar material, then the so obtained structure is mechanically drawn, flattened or upsetted and the tubes are removed by an etching process. The remaining structure comprises elongated channels which following an oxidation enables the manufacture of electrolytic capacitors with increased storage capacity.

It is a well-known fact that of the electrolytic capacitors the material of the ones with most favorable properties is very expensive, like tantalum, and there exists no cheap technology by which very fine fibres with diameters in the micron range could be made from such materials. This difficulty explains the wide acceptance of sintering technique which, however, does not allow the utilization of the optimum dimensioning referred to hereinabove.

In case of electrolytic fibre capacitors made by swaging or by sintering technique the establishment of an electrical connection between the fibres can not raise any problem, since the technology automatically ensures such a connection. In case of fibre capacitors made of dielectric fibres coated by a valve metal both the mechanical and electrical interconnection of the fibres causes problems, and further problems arise from the necessity of the sealing and insulation that must be provided between the electrolyte and the electrical connections.

The main object of the invention is to provide an anode structure for electrolytic fibre capacitors, in which the optimum dimensioning is possible, and the structure can be manufactured without any excess demand on skill or expenses.

In order to comply with the main object, I had to review the priorites of the prior art. My main concern was to re-evaluate whether the disadvantages connected with the use of dielectric fibres with a valve metal coating could be overcome, since I saw a number of advantages for using such coated dielectric fibres. One of the advantages lies in that a coated fibre uses much less of the expensive valve metal than a fibre made of such a metal. An other advantage lies in the mechanical properties of dielectric fibres, mainly glass fibres, since they have a substantial rigidity, they do not tend to get twisted in a bundle, etc.

A further object of the invention is to provide a manufacturing method which can ensure that coated fibres can be electrically and mechanically interconnected in such a way that the effects of the presence of the electrolyte can not affect the electrical connections and cannot cause leakages.

A still further object of the invention is to provide a method by which an electrolytic capacitor can be made of the anode structure.

The invention lies in the recognition that a parallel structure of glass fibres coated by a valve metal can be interconnected in an end region by means of a suitable insulating resin material if the resin has a suitable viscosity and it can not flow long into the capillary tubes between the fibres, but it can ensure the required sealing effect and rigidity, i.e. in liquid state it dampens the fibres. The resin should be resistant against the electrolytes usable in electrolytic capacitors. It is preferable if an end section of the fibres extend over the insulating resin, and this section can be interconnected by means of an electrically conductive other resin. The conductive resin is closely attached to the insulating resin and it enables the soldered connection of an outlet wire.

The active portion of the fibres that extend below the resin head should be immersed in an electrolyte in order that an oxide coating be formed on the valve metal surfaces. This can be done by conventional anode formation technique.

For making anode structures of larger size it is preferable if the structure comprises a frame of insulating material, the frame has a pair of cross members and a pair of longitudinal members, the fibres extend between the longitudinal members and supported by the cross members, the insulating resin is applied at a cross member and it connects the fibres to the cross member.

In this embodiment it is preferable if the cross members have flat U-shaped recesses for recieving the fibres, both ends of the fibres are attached to the respective ones of the cross members by means of the insulating resin, and the recesses are closed by plastic strips pressing the ends of the fibres to the cross members and are fixed by the insulating resin.

The method for making the anode structure according to the invention comprises the steps of winding a bundle of parallel fibres each having a valve metal outer surface on a mantle region of a drum to provide a fibre structure of predetermined width, the mantle region is defined by a plurality of spaced cross bars spanned across a pair of side walls, applying an insulating cross-linking resin to discrete locations of the fibre structure to mechanically interconnect and hermetically seal the fibres in the structure in the locations, letting the resin be hardened, cutting the fibre structure in such a way that respective short and long portions of fibres extend out of the respective hardened resins to provide a plurality of anode structures, in each anode structure applying a conductive resin to interconnect and seal the short end to provide an electrical outlet, hardening the conductive resin, immersing the longer portion of the fibre structure in an electrolyte, and applying a formation voltage between the outlet and the electrolyte to provide oxide coating on said fibres in the longer portion.

It is preferable if the insulating resin is applied in the region where the cross bars extend.

According to the invention a method is provided for making an electrolytic capacitor of the anode structure, which comprises the steps of depositing manganese nitrate solid electrolyte material on the body of the structure, drying the material, depositing a graphite layer on the solid electrolyte, drying the graphite layer, applying a conductive resin on the graphite layer to provide a second electrical outlet, attaching respective outlet wires to the conductive resins, and coating the whole structure by an insulating resin from which only the two wires extend.

Figure 6:
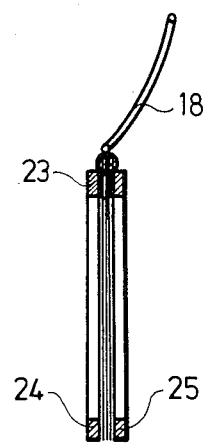
Figure 7:
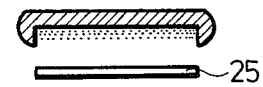
Figure 8:
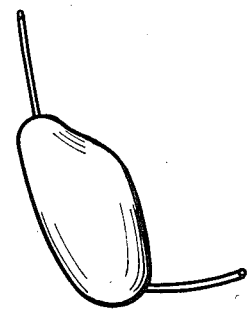

The invention will now be described in connection with preferable embodiments thereof, in which reference will be made to the accompanying drawings. In the drawing:

FIG. 1 shows a schematic view of a drum usable for manufacturing the anode structure according to the invention, FIGS. 2a and 2b are sketches illustrating a phase of manufacture, FIGS. 3a and 3b are sketches illustrating a further phase of the manufacture, FIG. 4 illustrates the soldering of the outlet wire, FIG. 5 shows the elevation view of an anode structure on a support frame, FIG. 6 is the side view of FIG. 5, FIG. 7 is a sectional view along line VII—VII of FIG. 5 with a removed closing strip, and FIG. 8 illustrates a ready-made electrolytic capacitor.

FIG. 1 shows a fragment of a support drum 10 made preferably of a plastic material which has an axis parallel to the plane of the drawing. The drum 10 has a pair of side walls 11, 12 bridged by a plurality of cross bars 13 distributed evenly along the circumferential region of the drum 10. The form of the drum 10 can be circular or hexagonal, and in the scale of FIG. 1 only four of the cross bars 13 can be seen.

In the manufacturing method of anode structures for electrolytic capacitors according to the invention the drum 10 is rotated and a winding supported by the cross bars 13 is made. The winding consists of parallel bundles of thin glass fibres coated by a valve metal. The diameter of the fibres falls in the micron range and it is typically below or about 10 microns (e.g. 3 to 10 microns). The valve metal coating is made by known vacuum scattering technique prior to the winding step. The most preferable metal usable for the coating is tantalum, although any other valve metal (like aluminium, niobium, titan and the alloys of these metals) conventially used for making electrolytic capacitors can well be used as a coating material. The glass fibres can be replaced by any other fibre or the like which has a sufficient mechanical strength and a suitable adhesion to the coating, however, for the time being glass is considered to be the most preferable material for the fibres with regard to its low price and favorable properties.

Depending on the capacitance value of the capacitors to be manufactured, the winding can be made by a single layer or by several layers of the side by side turns of the bundles of the coated glass fibres. The width of the winding, as well as the distance between the adjacent cross bars 13 can be chosen to correspond to the required capacitance values. When the winding is completed, a fibre structure 14 is obtained on the drum 10 which consists of substantially parallel coated fibres. The drum 10 can comprise up to 300 cross bars 13, and the number of the cross bars on the drum corresponds to the number of the anode structures that can be made in a manufacturing process.

The next step is illustrated in FIGS. 2a and 2b. In this step the fibre structure 14 is fixed in the region of the cross bars 13 by means of a cross-linking resin. The hardened resin has an irregular, somewhat drop-like shape and it forms head 15. The fibres below the head 15 will form the active section of the anode structure, while the part above the head 15 are used for making electrical connection to the anode. The resin should be resistant against the electrolyte to which the anode structure is exposed, and it should definitely impede any leakage of the electrolyte. The cross linking resin should have a sufficiently low viscosity during application in order to prevent the small capillary channels formed between the fibres in the active section from being filled or penetrated by the resin. These requirements are met e.g. by the commercially available binding material Loctite 270.

In FIGS. 2a and 2b the resin head 15 can be seen in the region of a cross bar 13. The head 15 need not be bound to the cross bar, and it is preferable if the head together with the fibres fixed by the head 15 can be detached from the cross bar 13. FIG. 2b shows that the head 15 only touches the cross bar 13. The hardening of the resin can be facilitated by a suitable heat treatment e.g. by blowing warm air to the head. When the resin has hardened, the fibre structure 14 is cut as shown in the drawing, and the upper ends 16 of the fibres extend out from the head 15.

The next step in the manufacture is the establishment of an electrical connection between the coated ends of the fibres in the end region 16. This can be made by the application of an electrically conductive resin. The application can be made e.g. by dipping the end 16 in the resin. The resin can be a conventional material such as the silver paint "Electrodag+503" manufactured by the Acheson Company in the Netherlands, or the resin "EKOTE-3030" produced by the Acme Chemicals Co. (U.S.). Both of these resins provide a conductive surface to which soldering is possible. A suitable heat treatment can speed up to hardening of the conductive resin.

FIGS. 3a and 3b show the conductive resin 17 as attached to the head 15. The productivity can be higher if the conductive layer 17 is formed when the anode structure is still attached to the cross bars 13, however, this is not an inevitable requirement. When making the conductive layer attention should be paid that the conductive resin can not get into connection with the active section of the fibres below the head 15. The resin of the head 15 should provide a sufficient insulation between the active section of the fibres and the conductive resin 17.

Following the establishment of the conductive layer 17, the anode structure should be detached from the cross bar 13 (if this step has not been carried out earlier). The anode structure is self-supporting in this phase. The active section of the fibre structure 14 has a sufficient rigidity and the fibres keep their linear form and do not tend to diverge.

FIG. 4 shows the attachment of a lead out wire 18 which is made by a soldered connection. A preferable solder material may comprise 97% tin and 3% silver, or an other solder material may comprise 58% tin, 40% lead and 2% silver.

In the next step an oxide coating should be made on the surface of the coated fibres in the active section 20. This can be done by conventional anode formation technique. To this end the active section 20 should be inserted in an electrolyte and a formation voltage should be applied. The value of the formation voltage should correspond to the intended operational voltage of the capacitor to be made.

When the oxide layer is formed, an anode structure is obtained which can be used in electrolytic capacitors having either a liquid or a solid electrolyte. In such capacitors the anode structure should be immersed with its active section 20 in the electrolyte, and the arrangement should be encapsulated. Provision should be made for the electrical lead-out of the negative pole formed by the electrolyte.

In the example described hereinabove the anode structure was supposed to be self supporting. If the task lies in the manufacture of capacitors with higher capacitance values, then a more rigid structure should be made. A preferable embodiment of such a structure is illustrated in FIGS. 5 to 7. This embodiment differs from the one shown in FIGS. 1 to 4 in that instead of the cross bars 13 the drum 10 comprises support frames 21 with longitudinal members 22 and cross members 23,24.

The fibre structure 14 wound around the drum is fixed on the cross members 23, 24 by the application of the same cross-linking resin which was used in the first embodiment for making the head 15. When the resin has hardened, the frame 21 is cut as shown in FIG. 5. The upper end portion of the coated fibres extending out from the upper cross member 23 is not treated by the insulating resin. This part is immersed in the conductive resin in the same way as in the first embodiment and when the conductive resin has hardened, a lead out conductor is soldered thereto.

The mechanical strength of the structure can be increased if the longitudinal members 22 of the frame 21 have the cross-sectional profile as shown in FIG. 7 and the fibre structure 14 is received in the two flat U-shaped transverse recesses. These recesses can be covered by flat covering strips such as the lower strip 25 as shown in FIG. 6. The strips are bound by the insulating resin to the cross members 23 and 24 and to the fibres therebetween.

The formation of the coated fibres takes place in the same way as in case of the first embodiment.

The anode structures manufactured according to the invention form the basic part of electrolytic capacitors.

There are several ways how an electrolytic capacitor can be made from such an anode structure. In a preferable way a solid electrolyte is provided on the active section of the fibre structure. This is made in three consecutive cycles of depositing manganese nitrate as it is usual in case of the manufacture of sintered tantalum capacitors with solid electrolytes heating the manganese nitrate to form manganese dioxide. In the next step a single or a double graphite layer is provided on the solid electrolyte followed by respective drying steps by means of heated air. Thereafter a conductive resin is provided on the graphite surface. This can be the same as used for making the positive electrode in the first embodiment. When the conductive resin has hardened, a lead-out wire is soldered to it which enables electrical connections towards the negative electrode. The so-obtained structure is already a functioning electrolytic capacitor. The whole structure is now immersed in a suitable insulating epoxy resin, which provides a sealed housing for the capacitor when it is hardened.

Such a capacitor is shown in FIG. 8 which has an irregular drop-like shape with a pair of lead-out wires. In the manufacturing process this step is followed by an appropriate measurement and quality control.

It need not be mentioned that the method for making electrolytic capacitors according to the invention is sufficiently effective to enable mass production. The winding of the fibres does not require any special skill, since this operation is made when the fibres are in bundles, and a bundle has sufficient strength to endure the mechanical effects that take place when the winding is made.

It has been mentioned that the fibres are made by a dielectric material coated by a valve metal. It can be understood, however, that the operation of the electrolytic capacitor remains unchanged if the fibres are actually made of valve metals, since the formation of the oxide layer requires only that the outer portion of the fibres be made of a valve metal. In this regard the valve metal fibres and the dielectric fibres coated by a valve metal should be considered as equivalent.

In a preferable embodiment the oxide formation step is preceded by coating the conductive resin 17 and the upper portion of the head 15 by a protective resin which can be an epoxy resin e.g. type CY 223 of Ciba-Geigy (Switzerland). This coating provides for a protection of the outlet during coating and it supports the soldered connection when the solid electrolyte is made. The epoxy resin of the housing can be made of the same material. The solder material can also be made of an alloy comprising 93% lead, 3% silver and 4% tin, which has a higher melting temperature and can better endure the heat effects during deposition of the solid electrolyte.

I claim:

1. Anode structure for use in an electrolytic capacitor, comprising a plurality of fibres extending substantially in parallel to each other, said fibres having at least their outer portion made of a valve metal, an oxide layer on an active section of said fibres, an electrically insulating resin hermetically sealing and mechanically interconnecting a section of each fibre adjacent to and leaving free said active section, an electrically conductive resin surrounding the oxide free end sections of said fibres to provide electrical interconnections between said fibres, said conductive resin constituting an electrical outlet for said structure and being spaced by said insulating resin from said active section.

2. The anode structure as claimed in claim 1, in which the fibres being made of glass fibres coated by a valve metal forming the outer portion.

3. The anode structure as claimed in claim 2, in which the diameter of the fibres being less than 20 microns.

4. The anode structure as claimed in claim 1, further comprising an outlet wire soldered to the conductive resin.

5. The anode structure as claimed in claim 1, in which the valve metal is tantalum.

6. The anode structure as claimed in claim 1, further comprising a frame of insulating material, the frame has a pair of cross members and a pair of longitudinal members, the fibres extending between the longitudinal members and supported by the cross members, the insulating resin is applied at a cross member and connecting the fibres to the cross member.

7. The anode structure as claimed in claim 6, in which the cross members have flat U-shaped recesses for receiving the fibres, both ends of the fibres being attached to the respective ones of the cross members by means of the insulating resin, and the recesses being closed by plastic strips pressing the ends of the fibres to the cross members and being fixed by the insulating resin.

8. A method for manufacturing the anode structure as claimed in claim 1, comprising the steps of winding a bundle of parallel fibres each having a valve metal outer surface on a mantle region of a drum to provide a fibre structure of predetermined width, the mantle region being defined by a plurality of spaced cross bars spanned across a pair of side walls, applying an insulating cross-linking resin to discrete locations of the fibre structure to mechanically interconnect and hermetically seal the fibres in the structure in the locations, letting the resin be hardened, cutting the fibre structure in such a way that respective short and long portions of fibres extend out of the respective hardened resins to provide a plurality of anode structures, in each anode structure applying a conductive resin to interconnect and seal the short end to provide an electrical outlet, hardening said conductive resin, immersing the longer portion of the fibre structure in an electrolyte and applying a formation voltage between the outlet and the electrolyte to provide oxide coating on the fibres in the longer portion.

9. The anode as claimed in claim 8, in which the insulating resin being applied in the region where the cross bars extend.

10. The method as claimed in claim 8, further comprising the step of soldering an outlet wire to the conductive resin.

11. The method as claimed in claim 8, in which during the hardening steps heat treatment is applied.

12. A method for making an electrolytic capacitor from the anode structure as claimed in claim 1, comprising the steps of depositing mangenese nitrate solid electrolyte material on the body of the structure, heating the material to form manganese dioxide, depositing a graphite layer on the solid electrolyte, drying the graphite layer, applying a conductive resin on the graphite layer to provide a second electrical outlet, attaching respective outlet wires to the conductive resins, and coating the whole structure by an insulating resin from which only the two wires extend.

13. The method as claimed in claim 12, in which the depositing and drying steps are carried out in a predetermined number of cycles.

14. The method as claimed in claim 12, in which the attachment of the outlet wire is made by soldering.

* * * * *